United States Patent [19]

Gancy et al.

[11] 3,984,527
[45] Oct. 5, 1976

[54] PRODUCTION OF LOW BULK DENSITY PRODUCT FROM SODIUM BICARBONATE BY THE USE OF AN INERT GAS STREAM

[75] Inventors: Alan B. Gancy; Rustom P. Poncha, both of Syracuse, N.Y.

[73] Assignee: Allied Chemical Corporation, Morris Township, N.J.

[22] Filed: Jan. 13, 1975

[21] Appl. No.: 540,614

[52] U.S. Cl. .............................. 423/425; 423/427
[51] Int. Cl.² ............................................. C01D 7/14
[58] Field of Search .......... 423/419, 422, 425, 426, 423/427, 421

[56] References Cited
UNITED STATES PATENTS

| 1,473,259 | 11/1923 | Sundstrom | 423/425 |
| 1,503,481 | 8/1924 | Cocksedge | 423/427 |
| 1,583,660 | 5/1926 | Cocksedge | 423/425 |
| 1,583,662 | 5/1926 | Sundstrom et al. | 423/425 |

FOREIGN PATENTS OR APPLICATIONS

| 210,628 | 2/1924 | United Kingdom | 423/425 |
| 202,678 | 8/1922 | United Kingdom | 423/425 |

*Primary Examiner*—Oscar R. Vertiz
*Assistant Examiner*—Gary P. Straub
*Attorney, Agent, or Firm*—Anthony J. Stewart; Jack B. Murray, Jr.

[57] ABSTRACT

Low bulk density products containing at least 10% Wegscheider's Salt, by weight, in needlelike form are produced from sodium bicarbonate by heating in the presence of a slow inert gas stream an aqueous feed mixture comprising, by weight, at least about 50% sodium bicarbonate and about 15 to 30% Wegscheider's Salt.

8 Claims, 3 Drawing Figures

PRODUCTION OF LOW BULK DENSITY PRODUCT FROM SODIUM BICARBONATE BY THE USE OF AN INERT GAS STREAM

BACKGROUND OF THE INVENTION

1. Field of the Invention

This invention relates to the conversion of sodium bicarbonate to a lower bulk density product containing at least 10% Wegscheider's Salt ($Na_2CO_3 \cdot 3NaHCO_3$), by weight. The product is a soluble, low density, mildly alkaline base which absorbs liquid wetting agent without subsequent "bleeding" onto the packaging material. This product may be used in the preparation of laundry detergents containing substantially no phosphates.

2. Description of the Prior Art

The preparation of Wegscheider's Salt by heating aqueous sodium bicarbonate at temperatures ranging from about 75° to 120° C. is known. This concept is disclosed in U.S. Pat. Nos. 1,583,660 and 1,583,662 and in British Pat. No. 202,678. British Pat. No. 202,678 discloses that at 98° C. substantially full conversion was obtained in 1½ hours, that at 95° C. substantially full conversion was obtained in 6 hours and that at 90° C. about 50% conversion was obtained in 11 hours. Processes for heating wet sodium bicarbonate alone as described in these patents are not now commercially feasible. Product material tends to stick and cake, and a satisfactory low density product suitable for use as a detergent is not obtainable.

Dry sodium bicarbonate is known to decompose very slowly to Wegscheider's Salt. For example, dry crude sodium bicarbonate, when heated to about 120° C. for about 50 minutes, contained only about 5% Wegscheider's Salt; on the other hand, wet crude sodium bicarbonate heated to about 120° C. for about 50 minutes formed 50% Wegscheider's Salt in 50 minutes.

Addition of sodium carbonate to aqueous sodium bicarbonate is disclosed in U.S. Pat. Nos. 1,473,259 and 1,583,662 and British Pat. No. 210,628. These patents disclose that about 30% (dry basis) or about 28–29% (wet basis) sodium carbonate by weight, is present in the feed. Such addition of sodium carbonate, per se, tends to reduce the sticking and caking problem and to increase reaction rate but does not result in products having low bulk densities, e.g. as low as about 95 grams per liter, for high Wegscheider's Salt values, i.e. in excess of 50% Wegscheider's Salt in the product.

SUMMARY OF THE INVENTION

In accordance with our invention, alkali products having low bulk densities ranging from about 95 to 400 grams per liter (about 6 to 25 pounds per cubic foot) with chemical compositions ranging from at least 10 to about 100% Wegscheider's Salt can be prepared. More particularly, we have found that products which comprise at least 10% by weight of randomly oriented Wegscheider's Salt particles in needlelike form, with the remainder of the product being sodium sesquicarbonate, sodium bicarbonate, and water, can be obtained from a sodium bicarbonate feed material. The product of our invention can have, in general, a bulk density ranging from about 95 to about 400 grams per liter, a water content of less than about 1% by weight and a pore volume ranging from about 0.10 to about 0.16 milliliters per gram (based on pores of 2 micron size and smaller).

It has also been found that, when sodium bicarbonate is mixed with an amount of water sufficient to enhance formation of Wegscheider's Salt in needlelike form and with from about 15 to 30%, by weight, of Wegscheider's Salt in said mixture and when said mixture is exposed to a heat treatment at a given temperature and then to an inert gas treatment at substantially the same temperature or within about 5° C. greater than or less than such temperature, product particles have a lower bulk density and a greater absorptive property than the feed particles are obtained. For purposes of this invention, the expression "inert gas" is defined to be any gas which is unreactive with the reaction mixture of any of its components. A particularly preferred inert gas for use in this invention is air.

The process of our invention for treating sodium bicarbonate to obtain a substantially lump-free product having a lower bulk density than the feed comprises the following: an aqueous feed mixture comprising, by weight, at least about 50% sodium bicarbonate, about 15 to 30% Wegscheider's Salt, and about 8 to 20% water is passed to a reaction zone. The amount of water present in the feed mixture must be sufficient to enhance formation of Wegscheider's Salt in needlelike form. Preferably, the aqueous feed mixture comprises, by weight, about 50 to 70%, more preferably 55 to 65%, sodium bicarbonate, about 15 to 25% Wegscheider's Salt and about 12 to 18% water. Thereafter, the mixture is subjected to an activation step conducted in the absence of added carbon dioxide and added inert gas and without a substantial weight loss at an activation temperature ranging between a temperature below which sodium bicarbonate is converted into nuclei of Wegscheider's Salt and a temperature above which both substantial thermal decomposition of sodium bicarbonate and substantial formation of sodium sesquicarbonate occurs for a time sufficient to form a Wegscheider's Salt nuclei while avoiding substantial caking and bulk density increase of the mixture. The activation temperature preferably ranges from about 85° to 95° C., more preferably ranging from about 87° to 92° C. and most preferably being about 90° C., as adjusted to 1 atmosphere. The heating during the activation step preferably is carried out for about 15 to 50 minutes.

After the activation step is completed, the mixture continues to react at a temperature ranging between a temperature about 5° C above the activation temperature and a temperature about 5° C below the activation temperature. Such post-activation temperature preferably ranges from about 85° to 95° C. and more preferably ranges from about 87° to 92° C. Reaction continues without the addition of carbon dioxide in the presence of a substantially dry inert gas stream at a rate less than about a rate at which substantial dryness of the feed mixture can occur. Preferably, the inert gas is air and the rate of air flow ranges from about 1.5 to 3.2, more preferably about 1.7 to 2.3 milliliters per minute per gram of the feed mixture. The aeration time preferably ranges from about 20 to 50, more preferably from about 35 to 45 minutes.

We have found that the dry inert gas (e.g. air) stream sweeps away some of the water vapor. The reduction in water vapor partial pressure causes an increase in the vapor pressure of carbon dioxide from the decomposition of sodium bicarbonate. The increase in the carbon dioxide concentration facilitates the conversion of the decomposition of the bicarbonate into Wegscheider's Salt.

In a preferred embodiment of this invention, the Wegscheider's Salt portion of the feed is obtained by recycling a portion of the product particles which are removed from the reaction zone.

By the process of this invention, sticking and caking in the reaction product and during the reaction are avoided and products having bulk densities as low as 95 grams per liter are obtained. In our invention a lower amount of sodium carbonate value in the form of Wegscheider's Salt is added to the aqueous feed mixture than is known to be added in prior art processes. The reaction mixture, when maintained at the first temperature, remains free flowing; and, when thereafter subjected to a slow inert gas stream at the same first temperature, such mixture expands rapidly to form Wegscheider's Salt. The formation of Wegscheider's Salt needles makes the reaction product absorbent and prevents sticking and caking. Without the activation step the reaction mixture tends not to expand and tends not to become absorbent, thus causing substantial caking in the reactor.

DESCRIPTION OF THE PREFERRED EMBODIMENT

Figure 1:
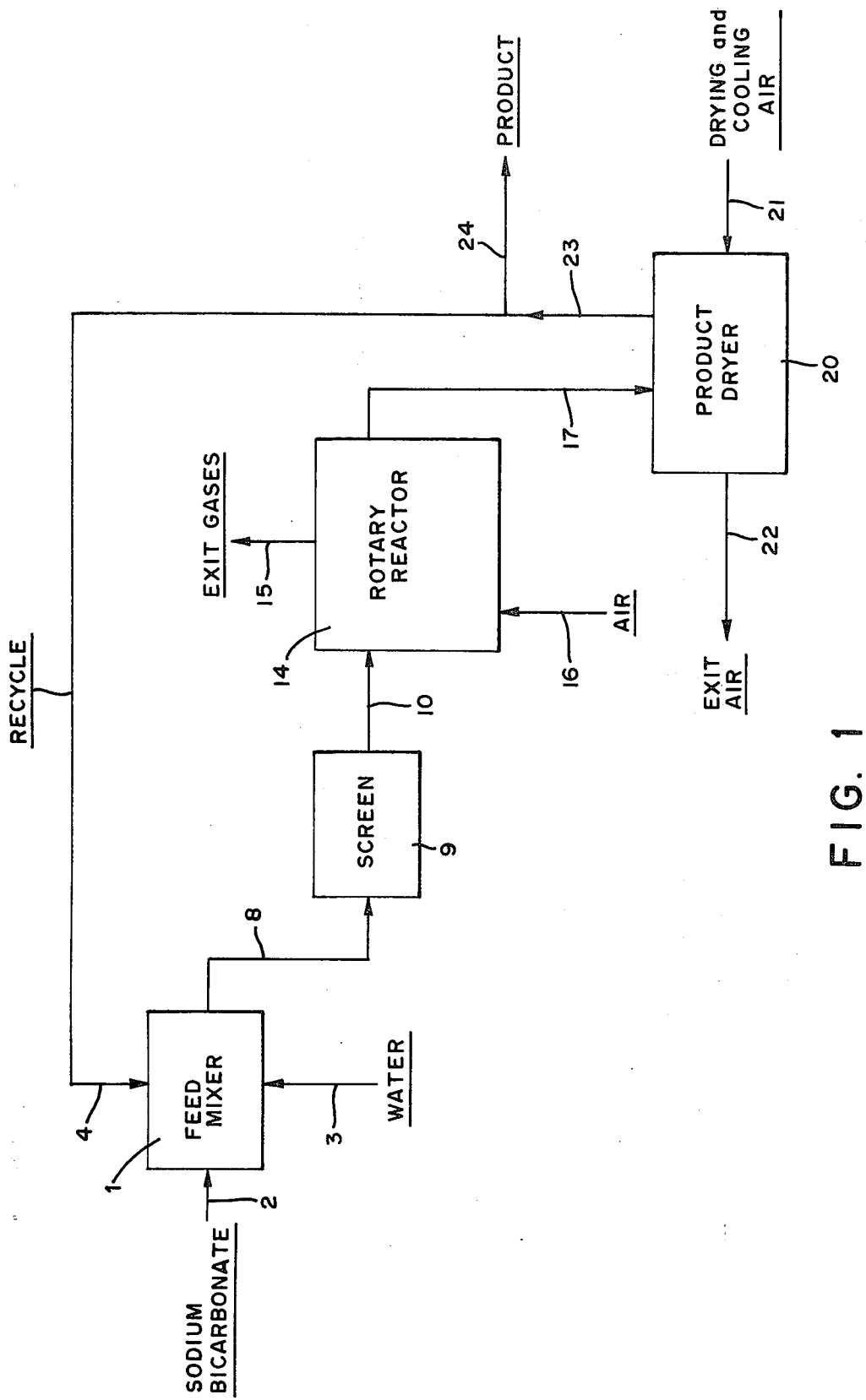
FIG. 1 is a schematic flow diagram illustrating one method of carrying out the present invention.
Figure 2:
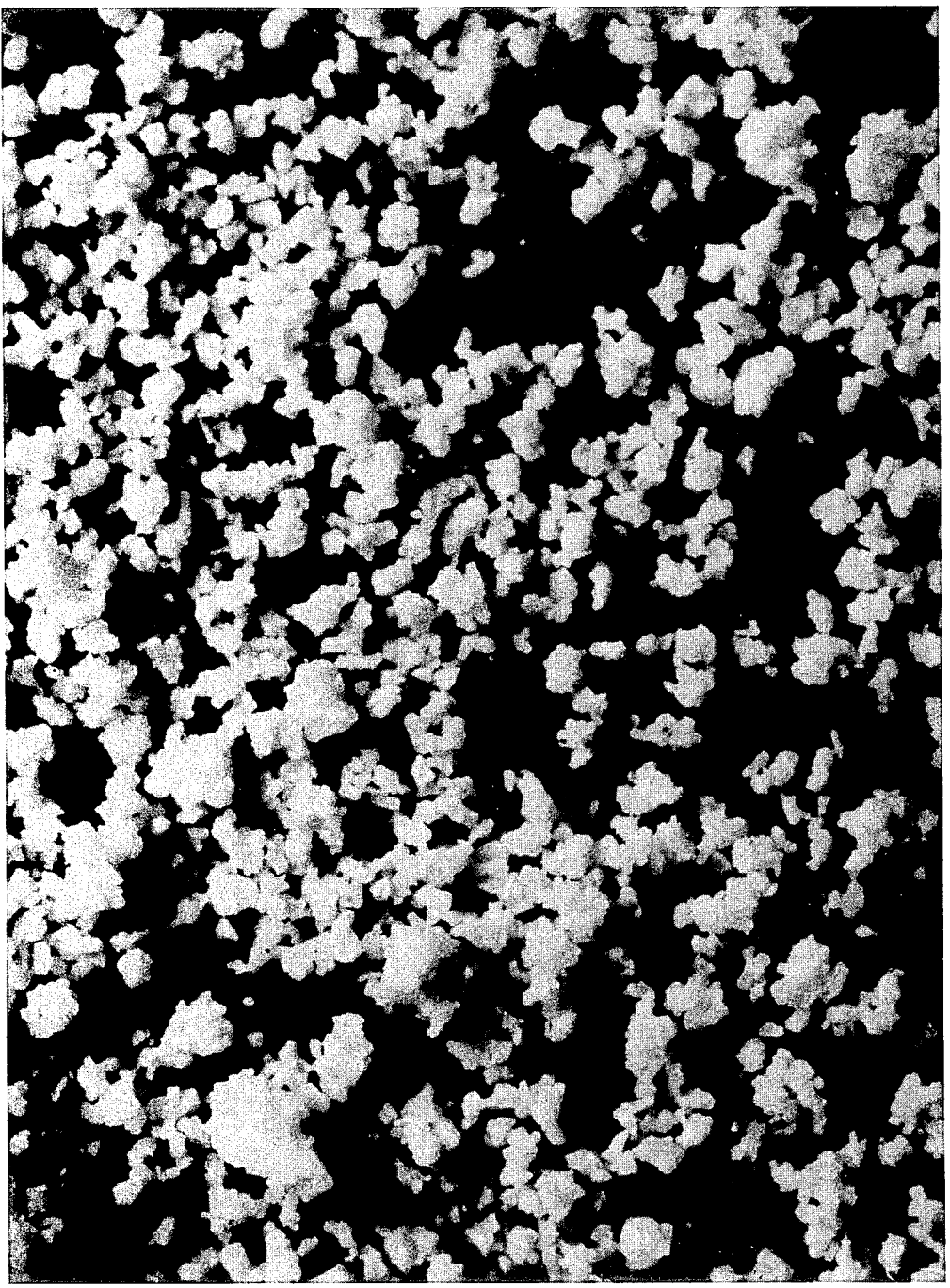
FIG. 2 (magnification 50X) is a photograph of typical crude sodium bicarbonate feed particles.
Figure 3:
FIG. 3 (magnification 50X) is a photograph of typical product particles containing about 100% Wegscheider's Salt.

The accompanying drawing, FIG. 1, diagrammatically illustrates one method of carrying out the present invention. Particles of crude sodium bicarbonate enter feed mixer 1 via line 2. The crude bicarbonate, in general, has an air-dried bulk density of about 600 grams per liter. A suitable sodium bicarbonate containing component which may be used in this invention is crude sodium bicarbonate prepared by the Solvay Process and having a water content of about 15%. When such crude sodium bicarbonate is used in the process of this invention, additional water does not normally need to be added to the feed mixer. For a suitable low bulk density product, the water content of the feed ranges preferably between about 12 and 18%, by weight. Premature reduction of the water content in the feed leads to caking and causes the resulting product to have an undesirable high bulk density. If the water content of the wet sodium bicarbonate is less than about 8%, by weight, Wegscheider's Salt may still be formed but it tends not to be in needlelike form which enhances low bulk density. The needlelike structure of Wegscheider's Salt not only makes the product absorptive, but such structure also tends to enhance absorption of water released during the reaction so as to avoid lumping.

To this aqueous sodium bicarbonate in mixer 1 is added via line 4 an amount of Wegscheider's Salt ranging from about 15 to 30%, by weight, of the feed mixture comprising sodium bicarbonate, Wegscheider's Salt and water. The addition of Wegscheider's Salt enhances a free-flowing charge and lump-free low-density product. Reduction of Wegscheider's Salt to values below the lower end of the range tends to yield a non-free flowing, high bulk density product which exhibits caking. When product particles containing 50 to 100% Wegscheider's Salt are desired, an amount of Wegscheider's Salt preferably ranging from about 15 to 25%, by weight of the feed mixture, is added to feed mixture 1. Preferably, Wegscheider's Salt is added to the wet sodium bicarbonate in the form of product recycle.

The components of the feed are mixed in feed mixture 1 until a uniform mixture is obtained.

Aqueous feed mixture particles from feed mixer 1 thereafter pass through line 8 into screening device 9 to break up any large lumps of feed mixture. A 12-mesh screen is normally sufficient for this purpose.

The screened aqueous mixture is then passed via line 10 into rotary reactor 14 which is rotated at a slow speed of the order of about 30 to 40 rpm. The rotary reactor 14 is heated to maintain the temperature of the aqueous feed mixture particles at an activation temperature ranging between a temperature below which sodium bicarbonate is unable to be converted into nuclei of Wegscheider's Salt and a temperature above which substantial thermal decomposition of sodium bicarbonate and substantial formation of sodium sesquicarbonate occurs. Preferably, this activation temperature ranges from about 85° to 95° C., more preferably from about 87° to 92° C., most preferably about 90° C., as adjusted to a pressure of 1 atmosphere. A temperature of at least about 85° C. is needed normally to produce Wegscheider's Salt nuclei. A temperature not in excess of about 95° C. is normally employed so as to avoid thermal decomposition of sodium bicarbonate and thus formation of sodium sesquicarbonate. We have found that at an activation temperature of about 70° or 80° C. only a partial reaction occurs, and caking and lumping tend to be present in the product. The preferred minimum of 85° C. is derived in part from analysis of phase data for the sodium bicarbonate-water system.

The mixture is activated at this activation temperature for a time sufficient to form Wegscheider's Salt nuclei and to avoid substantial caking and increase in bulk density of the mixture. Acceptable results have been found by reacting the mixture for about 15 to 50 minutes. If a first time less than about 15 minutes is employed, Wegscheider's Salt nuclei will not be formed from sodium bicarbonate, and sodium sesquicarbonate formation will be enhanced. Any increase in the activation time generally has no beneficial effect, but a reduction in the activation time tends to cause caking and a higher bulk density product. Furthermore, an insufficient period of activation at this temperature appears to prevent formation of Wegscheider's Salt nuclei as well as to force the reaction to sodium sesquicarbonate formation which in turn tends to dry up the aqueous feed mixture. We have found that substantially no weight loss and substantially no expansion of the feed mixture occurs during the activation step.

The mixture thereafter continues to react within rotary reactor 14 preferably at a temperature ranging between 85° and 95° C. and within a temperature about 5° C. above or below the activation temperature, more preferably at substantially the same temperature as during the activation step. A stream of dry inert gas is now passed slowly through the reaction mixture after activation is completed. We have found, surprisingly, that through the use of the inert gas stream an excellent low density product may be obtained at a second temperature which approximates the activation temperature, thus making possible a savings in energy requirements needed to carry out the process of this invention.

This second temperature must not exceed the temperature limits encompassed by the broad range described for the activation temperature. After activation occurs at a preferable temperature ranging from about 87° to 92° C., most preferably about 90° C., dry air is most preferably passed through the reaction mixture at substantially the same temperature, most preferably about 90° C. Inert gas stream treatment times preferably range from about 35 to 45 minutes. A flow rate preferably ranging from about 1.5 to 3.2, most preferably 1.7 to 2.3, milliliters per minute per gram, has been found to be effective.

The rate of flow of the inert gas stream is not critical except that the air rate should be less than that which causes substantial dryness of the reaction mixture. Through the use of the inert gas stream, products containing bulk densities of about 95 grams per liter have been obtained. As the inert gas stream flow rate approaches a rate above which dryness of the reaction mixture occurs, the bulk density of the product tends to increase substantially. We have also found that products of the desired properties are not obtained if inert gas is also passed through the reaction mixture during the activation step of the process.

A gas exit line 15 is provided in rotary reactor 14 to vent gases formed within the rotary reactor 14. Exit gases may be vented to the atmosphere or to a gas recovery unit (not shown).

The product particles are discharged from reactor 14 through line 17 into a conventional product dryer 20. Drying and cooling air is introduced into cooler 20 through line 21. Separated air is released through line 22 to the atmosphere. Dried product is passed through line 23. A portion of this product is preferably recycled to the feed mixture through line 4. The remaining product passes through line 24 for further processing. The product is especially useful as an ingredient in laundry detergent which desirably has substantially no phosphate content.

In general, the product particles comprise Wegscheider's Salt, sodium bicarbonate and sodium sesquicarbonate. If the reaction is carried to completion, product particles containing 100% Wegscheider's Salt will normally result. Hence, the chemical composition of the product of this invention can be varied from 10% Wegscheider's Salt to 100% Wegscheider's Salt. The normal range of product composition is illustrated more fully in the table below:

| RANGE OF PRODUCT COMPOSITION | | | | |
|---|---|---|---|---|
| | Wegscheider's Salt | | | |
| Compounded | 100% | 50% | 15% | Approx. 10% |
| % Sodium Bicarbonate | 71.3 | 84.8 | 86.8 | 90.0 |
| % Sodium Carbonate | 28.5 | 14.5 | 12.9 | 9.3 |
| % Water | 0.2 | 0.7 | 0.3 | 0.7 |

When crude sodium bicarbonate from the Solvay Process is used as the sodium bicarbonate component of the aqueous feed mixture, this crude sodium bicarbonate normally has about 0.8% ammonia content and an ammonia odor. After such crude bicarbonate is employed in the process of this invention, the product contains only about 0.02% ammonia and does not exhibit any substantial ammonia odor.

The product porosities are pore volumes which represent part of the spectrum of pores revealed via mercury porosimetry. In mercury porosimetry a sample is progressively pressurized with liquid mercury, and volume readings are made periodically. A particular part of the total spectrum, "useful pores", is determined by measuring total porosity of various soda materials and by measuring the tendency of such materials to bleed when impregnated with liquid non-ionic surfactants. Correlation between these two kinds of measurement may be made at volumes of pores which are 2 microns and smaller in size. Larger pores do not seem to have the required capillarity. The volume of all pores up to 2 microns in diameter is used to indicate useful porosity because of such correlation between such useful porosity and absorption of liquid non-ionic wetting agent. Under this system of measurement sodium bicarbonate has no measurable porosity. A porosity of the product of the present invention ranging from about 0.10 to 0.16, based on the volume of pores which are 2 microns and smaller, can be obtained. As merely illustrative, our product having such pore volume can absorb about 50% of wetting agent.

As previously stated, th bulk density for the product of this invention ranges between about 95 to about 400 grams/liter (g/l). This is compared to an approximate bulk density of about 600 g/l for air-dried crude sodium bicabonate.

Friability is defined as the sum of the two entities, breakage and attrition. Friability is determined as follows: A −20 to +80 mesh portion of the sample is placed on a 100-mesh screen with 50 grams of 5-mm glass beads. A 140-mesh screen and pan are placed underneath. After vibration, the portion of the sample passing through the 100-mesh screen and standing on the 140-mesh screen is reported as "percent breakage." The portion passing through 140-mesh is called "percent attrition." The friability of a typical product of the present invention may range from about 6 to 90% for products ranging from about 100 to 10% Wegscheider's Salt, by weight, respectively.

By control of the water content of feed mixture, the amount of Wegscheider's Salt in feed mixture, the activation time, the aeration time, or the temperature in accordance with the process of this invention, products having a variety of bulk densities ranging from about 95 to 400 g/l can be prepared. Generally, the bulk density depends on the chemical composition of the product. Products having low bulk densities have a high Wegscheider's Salt content and a low free sodium bicarbonate content; on the other hand, products having high bulk densities are low in Wegscheider's Salt and high in free sodium bicarbonate. By the process of this invention a low bulk density product is obtained in a relatively short length of time and is substantially free of caking and lumping.

We have found that when moist sodium bicarbonate is heated up to 110° C. without an activation step, such a low density product is not obtained. We have further found that a low bulk density product is not obtained when the air stream is also passed during the activation step as well as the aeration step. We have also found that the activation step is not a pre-drying step because substantially no weight loss accompanies the activation. It is important in our invention that sodium carbonate values are added to the feed mixture in the form of Wegscheider's Salt and not in the form of sodium carbonate per se.

EXAMPLE 1

This operation was carried out in substantially the same manner as shown in FIG. 1. The feed mixture was about 100 grams of crude (wet) sodium bicarbonate (moisture content of about 15%, by weight) having a dry bulk density of about 650 g/l and about 33 grams of Wegscheider's Salt having a bulk density of about 215 g/l. The mixture was passed though a 12-mesh screen to break up the lumps. The screened mixture was thereafter placed in a 1-liter round-bottom flask. The flask was dipped in an oil bath held at about 90° C. The mixture was heated for 20 minutes after which a slow stream of dry air flowing at a rate of about 233 ml per minute was passed through the reaction mixture without raising the reactor temperature. The temperature of the reaction mixture dropped to about 87° C. and the reaction mixture began to expand. After exposing the mixture to the air stream for about 37 minutes, the flask was removed from the oil bath and the air stream continued for another 7 minutes. The dried product had a bulk density of about 95 g/l and was analyzed, by weight, at 65% Wegscheider's Salt, 5 % sodium sesquicarbonate, and 30% sodium bicarbonate.

EXAMPLE 2

This operation was carried out in substantially the same apparatus and under substantially the same conditions as in Example 1 except that an air stream of about 425 ml per minute was used. A product having a bulk density of 195 g/l and a Wegscheider's Salt content of 40% was obtained.

Various modifications and alterations will become apparent to those skilled in the art wihout departing from the scope and spirit of the invention, and it should be understood that the latter is not necessarily limited to the aforementioned discussion.

We claim:
1. A process for preparing a product from sodium bicarbonate which is substantially lump-free and which has a lower bulk density than said sodium bicarbonate, which comprises the steps of:
   a. passing to a reaction zone a feed mixture comprising by weight, (1) at least about 50% of said sodium bicarbonate, (2) about 15 to 30% Wegscheider's Salt, and (3) about 8 to 20% water;
   b. heating said feed mixture in the absence of added carbon dioxide and in the absence of an added inert gas stream to an activation temperature of from about 85° to 95° C for at least about 15 minutes to form Wegscheider's Salt nuclei and to avoid substantial caking and bulk density increase of the mixture; and
   c. thereafter subjecting said activated mixture in the absence of added carbon dioxide to a stream of substantially dry inert gas (1) at a rate less than the rate at which substantial dryness of the activated mixture occurs, (2) at an inert gas stream treatment temperature of from about 5° C above said activation temperature to about 5° C below said activation temperature, and (3) for a time sufficient to prepare product particles containing at least 10%, by weight, Wegscheider's Salt in needle-like form and having a lower bulk density than said activated mixture and greater porosity, as determined by mercury porosimetry, than said feed mixture, said lower bulk density being from about 95 to about 400 grams per liter, and said porosity being from about 0.10 to 0.16 based on the volume of pores which are 2 microns or smaller.

2. The process of claim 2 wherein said inert gas is air and the air rate ranges from about 1.5 to 3.2 ml/min/g of the activated mixture and the time of aeration ranges from about 20 to 50 minutes.

3. The process of claim 1 wherein said feed mixture comprises, by weight, about 50 to 70 percent sodium bicarbonate, about 15 to 30 percent Wegscheider's Salt, and about 8 to 20 percent water.

4. The process of claim 1 wherein said feed mixture comprises, by weight, about 55 to 65 percent sodium bicarbonate, about 15 to 25 percent Wegscheider's Salt, and about 12 to 18 percent water.

5. The process of claim 1 wherein the Wegscheider's Salt component of said feed mixture is obtained by recycling a portion of said product particles removed from said reaction zone.

6. The process of claim 1 wherein said activation temperature is from about 87° to 92° C. and said inert gas treatment temperature is from about 87° to 92° C.

7. The process of claim 1 wherein said activation time ranges from about 15 to 50 minutes.

8. The process of claim 1 wherein said inert gas stream temperature is from about 85° to 95° C.

* * * * *